(12) United States Patent
Ju et al.

(10) Patent No.: US 12,028,893 B2
(45) Date of Patent: Jul. 2, 2024

(54) COMMUNICATION NODE FOR SCHEDULING AND INTERFERENCE CONTROL IN WIRELESS COMMUNICATION NETWORK, AND OPERATION METHOD THEREFOR

(71) Applicant: ELECTRONICS AND TELECOMMUNICATIONS RESEARCH INSTITUTE, Daejeon (KR)

(72) Inventors: Hyung Sik Ju, Hwaseong-si (KR); Dong Hyuk Gwak, Daejeon (KR); Seon Ae Kim, Daejeon (KR); Yu Ro Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 371 days.

(21) Appl. No.: 17/562,932

(22) Filed: Dec. 27, 2021

(65) Prior Publication Data
US 2022/0124747 A1 Apr. 21, 2022

Related U.S. Application Data

(62) Division of application No. 15/870,833, filed on Jan. 12, 2018, now abandoned.

(30) Foreign Application Priority Data

Jan. 26, 2017 (KR) .................. 10-2017-0012644
Dec. 6, 2017 (KR) .................. 10-2017-0166729

(51) Int. Cl.
*H04W 72/12* (2023.01)
*H04L 5/00* (2006.01)
(Continued)

(52) U.S. Cl.
CPC ......... *H04W 72/569* (2023.01); *H04L 5/0037* (2013.01); *H04L 5/0044* (2013.01);
(Continued)

(58) Field of Classification Search
CPC ............. H04W 72/569; H04W 72/044; H04W 72/121; H04W 72/23; H04W 72/51;
(Continued)

(56) References Cited

U.S. PATENT DOCUMENTS 6,970,415 B1   11/2005  Galarza et al.
7,302,233 B2   11/2007  Onggosanusi et al.
(Continued)

FOREIGN PATENT DOCUMENTS

JP   2017502600 A     1/2017
KR   101001730 B1    12/2010
(Continued)

OTHER PUBLICATIONS

Hasna et al. "Performance Analysis of Cellular Mobile Systems With Successive Co-Channel Interference Cancellation", Jan. 2003, IEEE Transactions on Wireless Communications, vol. 2, No. 1; pp. 29-40 (Year: 2003).

(Continued)

*Primary Examiner* — Candal Elpenord
(74) *Attorney, Agent, or Firm* — Rabin & Berdo, P.C.

(57) ABSTRACT

An operation method of a base station in an IFD scheme may comprise receiving position information of each of a plurality of downlink (DL) terminals and a plurality of uplink (UL) terminals; determining a guard zone corresponding to each of the plurality of DL terminals based on the position information of each of the plurality of DL terminals; determining whether at least one UL terminal is located in the guard zone based on the position information of each of the plurality of UL terminals; determining a scheduling priority (Continued)

of each of the plurality of DL terminals according to whether at least one UL terminal is located in the guard zone; generating DL control information including frequency-time resource allocation information and interference control information based on the determined scheduling priority; and transmitting data signals and the DL control information to the plurality of DL terminals.

10 Claims, 9 Drawing Sheets

(51) Int. Cl.
| | |
|---|---|
| H04L 5/14 | (2006.01) |
| H04W 72/04 | (2023.01) |
| H04W 72/044 | (2023.01) |
| H04W 72/121 | (2023.01) |
| H04W 72/23 | (2023.01) |
| H04W 72/51 | (2023.01) |
| H04W 72/566 | (2023.01) |
| H04W 72/54 | (2023.01) |

(52) U.S. Cl.
CPC .............. *H04L 5/0069* (2013.01); *H04L 5/14* (2013.01); *H04W 72/044* (2013.01); *H04W 72/121* (2013.01); *H04W 72/23* (2023.01); *H04W 72/51* (2023.01); *H04W 72/54* (2023.01)

(58) Field of Classification Search
CPC .... H04W 72/54; H04L 5/0037; H04L 5/0044; H04L 5/0069; H04L 5/14
USPC .................................................. 370/329–330
See application file for complete search history.

(56) References Cited

U.S. PATENT DOCUMENTS

| | | | |
|---|---|---|---|
| 7,830,907 | B1 | 11/2010 | Petranovich et al. |
| 7,936,832 | B2 | 5/2011 | Ma et al. |
| 8,345,693 | B1 | 1/2013 | Kim |
| 9,055,576 | B2 | 6/2015 | Chen et al. |
| 9,544,792 | B2 | 1/2017 | Cheng et al. |
| 2003/0026356 | A1 | 2/2003 | Brommer |
| 2003/0142646 | A1 | 7/2003 | Paneth et al. |
| 2006/0252420 | A1 | 11/2006 | Mantravadi et al. |
| 2007/0232251 | A1 | 10/2007 | Murthy et al. |
| 2007/0280336 | A1 | 12/2007 | Zhang et al. |
| 2010/0248737 | A1 | 9/2010 | Smith |
| 2011/0237239 | A1 | 9/2011 | Chou et al. |
| 2012/0009964 | A1 | 1/2012 | Gormley et al. |
| 2013/0126713 | A1 | 5/2013 | Haas et al. |
| 2013/0196701 | A1 | 8/2013 | Tiirola et al. |
| 2015/0085753 | A1 | 3/2015 | Chen et al. |
| 2015/0085797 | A1 | 3/2015 | Ji et al. |
| 2015/0092677 | A1* | 4/2015 | Olsen .................... H04L 5/0073 370/329 |
| 2016/0014804 | A1 | 1/2016 | Merlin et al. |
| 2016/0087715 | A1* | 3/2016 | Kim ...................... H04L 5/0091 370/280 |
| 2016/0183232 | A1 | 6/2016 | Stirling-Gallacher et al. |
| 2016/0260301 | A1 | 9/2016 | Miller et al. |
| 2017/0019238 | A1* | 1/2017 | Sharma ................ H04L 5/1461 |
| 2017/0033916 | A1* | 2/2017 | Stirling-Gallacher ....................... H04W 72/0446 |
| 2017/0126458 | A1 | 5/2017 | Shattil |
| 2017/0201986 | A1* | 7/2017 | Chae .................... H04B 7/0456 |
| 2017/0302315 | A1 | 10/2017 | Sagong et al. |
| 2017/0332387 | A1* | 11/2017 | Zhang ................... H04W 72/12 |
| 2017/0353981 | A1 | 12/2017 | Lee et al. |
| 2017/0367062 | A1* | 12/2017 | Patel .................... H04W 72/1268 |
| 2018/0014355 | A1 | 1/2018 | Xue |
| 2018/0049204 | A1* | 2/2018 | Nory ................. H04W 72/0453 |
| 2018/0184432 | A1 | 6/2018 | Ryoo et al. |
| 2018/0331815 | A1* | 11/2018 | Lee ..................... H04L 27/2666 |

FOREIGN PATENT DOCUMENTS

| | | |
|---|---|---|
| KR | 1020160094321 A | 8/2016 |
| KR | 1020160131400 A | 11/2016 |
| KR | 1020170004986 A | 1/2017 |
| KR | 1020170006449 A | 1/2017 |
| KR | 1020170020184 A | 2/2017 |

OTHER PUBLICATIONS

Hüseyin Arslan and Karl Molnar; "Co-Channel Interference Cancellation With Successive Cancellation in Narrowband TDMA Systems"; 2000, Ericsson Inc; pp. 1070-1074 (Year: 2000).

* cited by examiner

▲ : BASE STATION
■ : DL TERMINAL
● : UL TERMINAL

COMMUNICATION NODE FOR SCHEDULING AND INTERFERENCE CONTROL IN WIRELESS COMMUNICATION NETWORK, AND OPERATION METHOD THEREFOR

CROSS-REFERENCE TO RELATED APPLICATIONS

This application is a division of U.S. application Ser. No. 15/870,833, filed on Jan. 12, 2018, which claims priorities to Korean Patent Applications No. 10-2017-0012644 filed on Jan. 26, 2017 and No. 10-2017-0166729 filed on Dec. 6, 2017 in the Korean Intellectual Property Office (KIPO), the entire contents of which are hereby incorporated by reference.

BACKGROUND

1. Technical Field

The present disclosure relates to a wireless communication network, and more specifically, to a communication node for scheduling and interference control in a wireless communication network and an operation method of the communication node.

2. Related Art

In a wireless communication network, a base station may operate in various duplexing schemes. For example, a base station may operate in an in-band full duplex (IFD) or half duplex (HD) scheme. The base station operating in the IFD scheme may transmit and receive signals to and from at least one terminal operating in the HD scheme. For example, the base station operating in the IFD scheme may transmit a data signal to a terminal through a downlink resource. Also, the base station operating in the IFD scheme may receive a data signal from a terminal through an uplink resource which is the same as the downlink resource at the same time. That is, the base station operating in the IFD scheme may perform downlink transmission and uplink reception using the same frequency-time resources.

However, self-interference (SI) due to a data signal transmitted through the downlink may affect a data signal received through the uplink. Accordingly, the base stations operating in the IFD scheme may experience reduced spectral efficiency due to the SI.

SUMMARY

Accordingly, embodiments of the present disclosure provide an operation method of a communication node for performing scheduling and interference control to enhance downlink performance and uplink performance in a wireless communication network.

Also, embodiments of the present disclosure provide a communication node for performing scheduling and interference control to enhance downlink performance and uplink performance in a wireless communication network.

In order to achieve the objective of the present disclosure, an operation method of a base station in an in-band full duplex (IFD) scheme may comprise receiving position information of each of a plurality of downlink (DL) terminals and a plurality of uplink (UL) terminals; determining a guard zone corresponding to each of the plurality of DL terminals based on the position information of each of the plurality of DL terminals; determining whether at least one UL terminal is located in the guard zone based on the position information of each of the plurality of UL terminals; determining a scheduling priority of each of the plurality of DL terminals according to whether at least one UL terminal is located in the guard zone; generating DL control information including frequency-time resource allocation information and interference control information based on the determined scheduling priority; and transmitting data signals and the DL control information to the plurality of DL terminals.

The determining a scheduling priority may further comprise when a first UL terminal is located in a first guard zone in which a first DL terminal is centered, generating first frequency-time resource allocation information for allocating a resource to the first DL terminal and the first DL terminal; generating first pairing information indicating that the first DL terminal and the first UL terminal use a same frequency-time resource; and generating first interference control information instructing interference cancellation.

The generating DL control information may further comprise generating first DL control information including the first frequency-time resource allocation information, the first paring information, and the first interference control information, and the transmitting data signals and the DL control information may further comprise transmitting a first data signal and the first DL control information to the first DL terminal.

The determining a scheduling priority may further comprise, when a second UL terminal and a third UL terminal are located in a second guard zone in which a second DL terminal is centered, determining a UL terminal using a same frequency-time resource with the second DL terminal based on position information of the second UL terminal and the third UL terminal.

The determining a scheduling priority may further comprise, when a distance between the second DL terminal and the second UL terminal is smaller than a distance between the second DL terminal and the third UL terminal, determining the second UL terminal as a UL terminal using a same frequency-time resource with the second DL terminal.

The determining a scheduling priority may further comprise generating second frequency-time resource allocation information for allocating a resource to the second DL terminal and the second UL terminal; generating second pairing information indicating that the second DL terminal and the second UL terminal use a same frequency-time resource; and generating second interference control information instructing interference cancellation.

The generating DL control information may further comprise generating second DL control information including the second frequency-time resource allocation information, the second paring information, and the second interference control information, and the transmitting data signals and the DL control information may further comprise transmitting a second data signal and the second DL control information to the second DL terminal.

The determining a scheduling priority may further comprise, when a UL terminal is not located in a third guard zone in which the third DL terminal is centered, determining a UL terminal using a same frequency-time resource with the third DL terminal based on position information of the third UL terminal and position information of a fourth UL terminal which is not located in the third guard zone.

The determining a scheduling priority may further comprise, when a distance between the third DL terminal and the third UL terminal is larger than a distance between the third DL terminal and the fourth UL terminal, determining the third UL terminal as a UL terminal using a same frequency-time resource with the third DL terminal.

The determining a scheduling priority further comprise generating third frequency-time resource allocation information for allocating a resource to the third DL terminal and the third UL terminal; generating third pairing information indicating that the third DL terminal and the third UL terminal use a same frequency-time resource; and generating third interference control information instructing interference cancellation. Here, the generating DL control information may further comprise generating third DL control information including the third frequency-time resource allocation information, the third paring information, and the third interference control information, and the transmitting data signals and the DL control information may further comprise transmitting a third data signal and the third DL control information to the third DL terminal.

In order to achieve the objective of the present disclosure, an operation method of a terminal receiving data signal from a base station operating in an in-band full duplex (IFD) scheme may comprise transmitting position information of the terminal to the base station; receiving, from the base station, frequency-time resource allocation information, pairing information, and interference control information; and determining whether to perform an interference cancellation operation based on the interference control information.

The frequency-time resource allocation information may include information on a frequency-time resource allocated to the terminal, the pairing information may include identification information of another terminal using a same frequency-time resource with the terminal, and the interference control information may include information instructing whether to perform an interference cancellation operation when the data signal is received.

The interference control information may be generated based on the position information of the terminal and the another terminal, include information instructing to perform the interference cancellation operation when a distance between the terminal and the another terminal is less than a threshold, and include information instructing not to perform the interference cancellation operation when the distance between the terminal and the another terminal exceeds a threshold.

The determining may further comprise receiving the data signal by performing the interference cancellation operation when the interference control information includes information instructing to perform the interference cancellation operation.

The determining may further comprise receiving the data signal without performing the interference cancellation operation when the interference control information includes information instructing not to perform the interference cancellation operation.

In order to achieve the objective of the present disclosure, a terminal receiving data signal from a base station operating in an in-band full duplex (IFD) manner may comprise a processor and a memory storing at least one instruction executed by the processor. Also, the at least one instruction may be configured to transmit position information of the terminal to the base station; receive, from the base station, frequency-time resource allocation information, pairing information, and interference control information; and determine whether to perform an interference cancellation operation based on the interference control information.

The frequency-time resource allocation information may include information on a frequency-time resource allocated to the terminal, the pairing information may include identification information of another terminal using a same frequency-time resource with the terminal, and the interference control information may include information instructing whether to perform an interference cancellation operation when the data signal is received.

The interference control information may be generated based on the position information of the terminal and the another terminal, include information instructing to perform the interference cancellation operation when a distance between the terminal and the another terminal is less than a threshold, and include information instructing not to perform the interference cancellation operation when the distance between the terminal and the another terminal exceeds a threshold.

The at least one instruction may be further configured to receive the data signal by performing the interference cancellation operation when the interference control information includes information instructing to perform the interference cancellation operation.

The at least one instruction may be further configured to receive the data signal without performing the interference cancellation operation when the interference control information includes information instructing not to perform the interference cancellation operation.

According to the embodiments of the present disclosure, a communication node in a wireless communication network may improve downlink performance and uplink performance through scheduling and interference control, thereby improving the communication performance of the entire wireless communication network.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
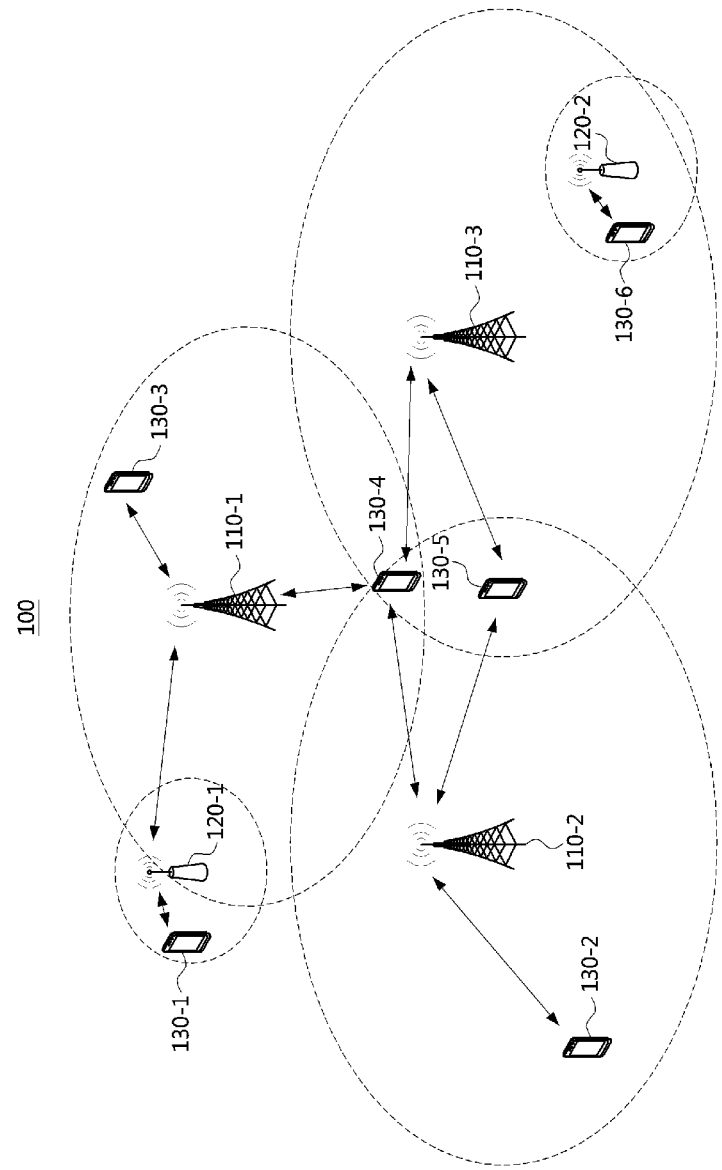
FIG. 1 is a conceptual diagram illustrating a first embodiment of a cellular communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating a first embodiment of a cellular communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may comprise a core network (e.g., a serving gateway (S-GW), a packet data network (PDN) gateway (P-GW), a mobility management entity (MME), and the like).

The plurality of communication nodes may support $4^{th}$ generation (4G) communication (e.g., long term evolution (LTE), LTE-advanced (LTE-A)), or $5^{th}$ generation (5G) communication defined in the $3^{rd}$ generation partnership project (3GPP) standard. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
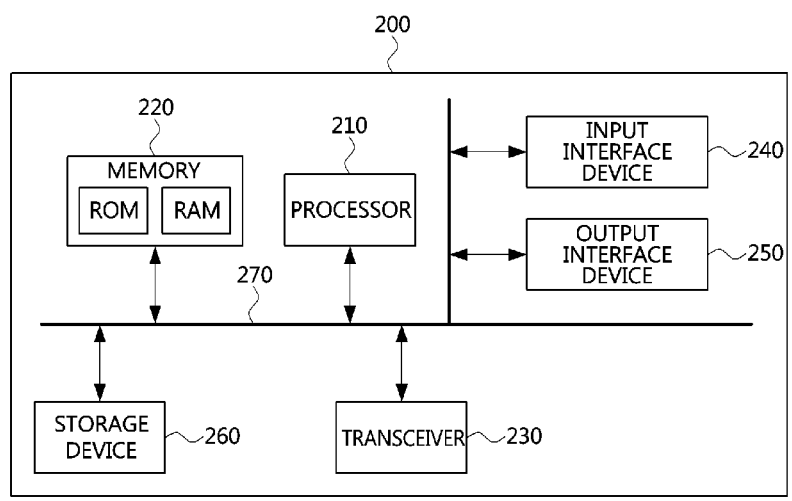
FIG. 2 is a block diagram illustrating a first embodiment of a communication node constituting a cellular communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Figure 3:
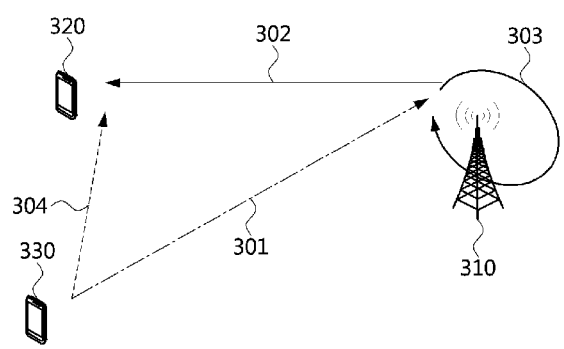
FIG. 3 is a conceptual diagram illustrating a second embodiment of a cellular communication network.

FIG. 3 is a conceptual diagram illustrating a second embodiment of a cellular communication network.

Referring to FIG. 3, a second embodiment of a communication network may be a mobile communication network. The communication network may include a base station 310, a first terminal 320, and a second terminal 330. The base station 310 may operate in an in-band full duplex (IFD)

scheme. Also, the first terminal 320 and the second terminal 330 may operate in a half duplex (HD) scheme.

The base station 310 may simultaneously use downlink (DL) and uplink (UL) in a predetermined frequency-time resource. That is, the base station 310 may simultaneously transmit and receive signals at the predetermined frequency-time resource. For example, the base station 310 may receive a UL signal from the second terminal 330 while transmitting a DL signal to the first terminal 320. Here, the base station 310 may remove self-interference (SI) generated by transmitting the DL signal.

Since the base station 310 may simultaneously transmit and receive signals over the same frequency-time resource in the IFD scheme, the base station 310 may improve a spectral efficiency of each link by up to twice as much as that of the HD scheme in an ideal environment. However, when the base station 310 transmits a signal through the DL, due to the SI caused by the IFD scheme, a reception performance through the UL may be degraded. Also, when the base station 310 receives a signal through the UL, co-channel interference (CCI) may be generated for a signal transmitted through the DL.

Therefore, the base station 310 operating in the IFD scheme may simultaneously degrade the reception performance on the UL and the transmission performance on the UL. As a result, the spectral efficiency of the base station of the IFD scheme may be lower than that of the half-duplex base station.

Figure 4:
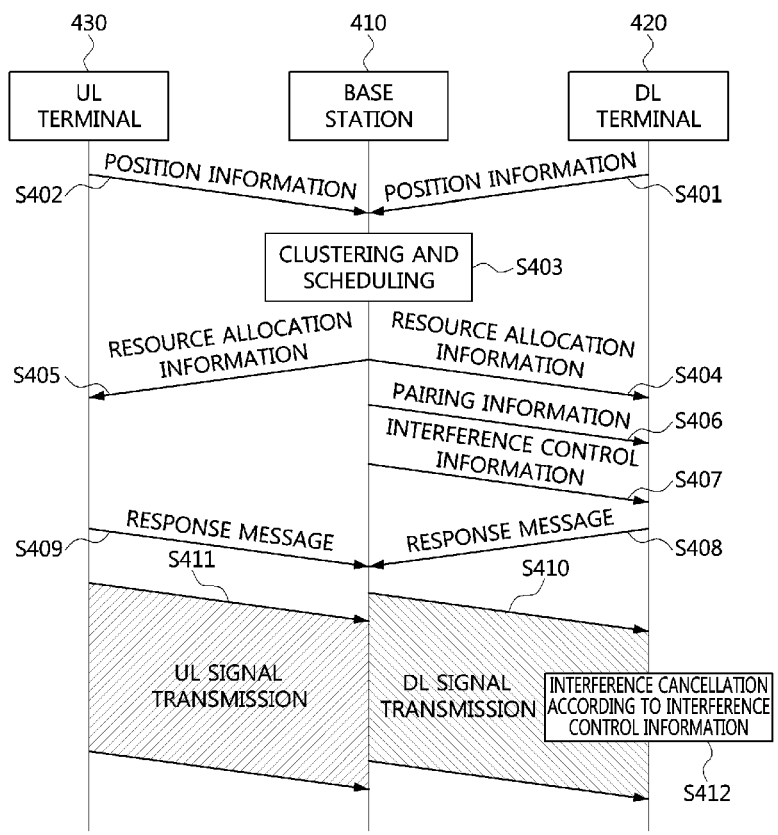
FIG. 4 is a sequence chart illustrating signal flows between a base station and terminals in a second embodiment of a cellular communication network.

FIG. 4 is a sequence chart illustrating signal flows between a base station and terminals in a second embodiment of a cellular communication network.

Referring to FIG. 4, a second embodiment of a communication network may include a base station 410, a DL terminal 420, and a UL terminal 430. The base station 410 may operate in the IFD scheme. Also, the DL terminal 420 and the UL terminal 430 may operate in the HD scheme.

Here, the DL terminal 420 may be affected by CCI due to a transmission signal of the UL terminal 430. Therefore, a DL performance of the DL terminal 420 may be degraded due to the CCI. Accordingly, the base station 410 may perform an operation for reducing deterioration of the DL performance.

For example, the base station 410 may perform scheduling for the DL terminal 420 and the UL terminal 430 to reduce deterioration in the DL performance. Also, the base station 410 may transmit a predetermined DL reception signal processing indication message to the DL terminal 420 in order to reduce deterioration of the DL performance.

The base station 410 may receive position information from each of the DL terminal 420 and the UL terminal 430 (S401, S402). For example, the base station 410 may receive position information of the DL terminal 420 from the DL terminal 420 (S401). Also, the base station 410 may receive position information of the UL terminal 430 from the UL terminal 430 (S402).

The base station 410 may then perform clustering and scheduling (S403). For example, the base station 410 may perform clustering and scheduling for the DL terminal 420 and the UL terminal 430 based on the position information of the DL terminal 420 and the UL terminal 430 (S403). The base station 410 may generate scheduling information through the clustering and scheduling. The scheduling information may include at least one of resource allocation information, pairing information, and interference control information. The base station 410 may transmit the scheduling information to the DL terminal 420 and the UL terminal 430.

The base station 410 may transmit the resource allocation information to the DL terminal 420 and the UL terminal 430 (S404 and S405). The resource allocation information may include information on a frequency-time resource allocated to the DL terminal 420 or the UL terminal 420. For example, the base station 410 may transmit to the DL terminal 420 the resource allocation information including information on at least one subframe or slot allocated to the DL terminal 420 (S404). Also, the base station 410 may transmit to the UL terminal 430 the resource allocation information on at least one subframe or slot allocated to the UL terminal 430 (S405).

The base station 410 may transmit the pairing information to the DL terminal 420 (S406). For example, the pairing information may be denoted as 'ConcurULUE.ID'. That is, 'ConcurULUE.ID' may indicate the pairing information. For example, the pairing information may include information on a UL terminal to be paired with the DL terminal 420. That is, the pairing information may include information on a UL terminal using the same channel with the DL terminal 420. For example, the pairing information may include identification information (e.g., ID) of the UL terminal using the same channel with the DL terminal 420.

The base station 410 may transmit the interference control information to the DL terminal 420 (S407). The interference control information may be denoted as 'SCCIC.Ind'. That is, 'SCCIC.Ind' may indicate the interference control information. For example, the interference control information may indicate whether or not the DL terminal 420 is required to perform a successive co-channel interference cancellation (SCCIC) operation when the DL terminal 420 receives a data signal from the base station 410 through the DL. For example, the interference control information may be information of a size of 1 bit.

The base station 410 may receive a response message from each of the DL terminal 420 and the UL terminal 430 (S408 and S409). The response message may be denoted as 'acknowledgement (ACK)'. For example, the DL terminal 420 may transmit to the base station 410 a response message indicating that the resource allocation information has been received to the base station (S408). Also, the UL terminal 430 may transmit to the base station 410 a response message informing that the UL terminal 430 has received the resource allocation information, the pairing information, and the interference control information (S409).

The base station 410 may transmit and receive data signals to the DL terminal 420 and the UL terminal 430 (S410 and S411). For example, when the base station 410 receives the response message from the DL terminal 420, the base station 410 may transmit a data signal to the DL terminal 420 through the DL (S410). For example, the DL terminal 420 may receive the data signal from the base station 410 through a frequency-time resource allocated based on the resource allocation information. Also, when the base station 410 receives the response message from the UL terminal 430, the base station 410 may receive a data signal from the UL terminal 430 through the UL (S411). For example, the UL terminal 430 may transmit the data signal to the base station 410 through a frequency-time resource allocated based on the resource allocation information.

The DL terminal 420 may control interference according to the interference control information (S412). The DL terminal 420 may identify the interference control information. The interference control information may include a value of '0' or '1'. For example, if the value of the interference control information is '1', the DL terminal 420 may perform the SCCIC operation.

For example, if the value of 'SCCIC.Ind' is '1', the DL terminal 420 may perform the SCCIC operation. For example, the DL terminal 420 may perform interference cancellation on the DL data signal received through the allocated frequency-time resource. Here, the DL terminal 420 may acquire data from the interference-canceled DL data signal. On the other hand, if the value of the interference control information is '0', the DL terminal 420 may not perform the SCCIC operation.

Figure 5A:
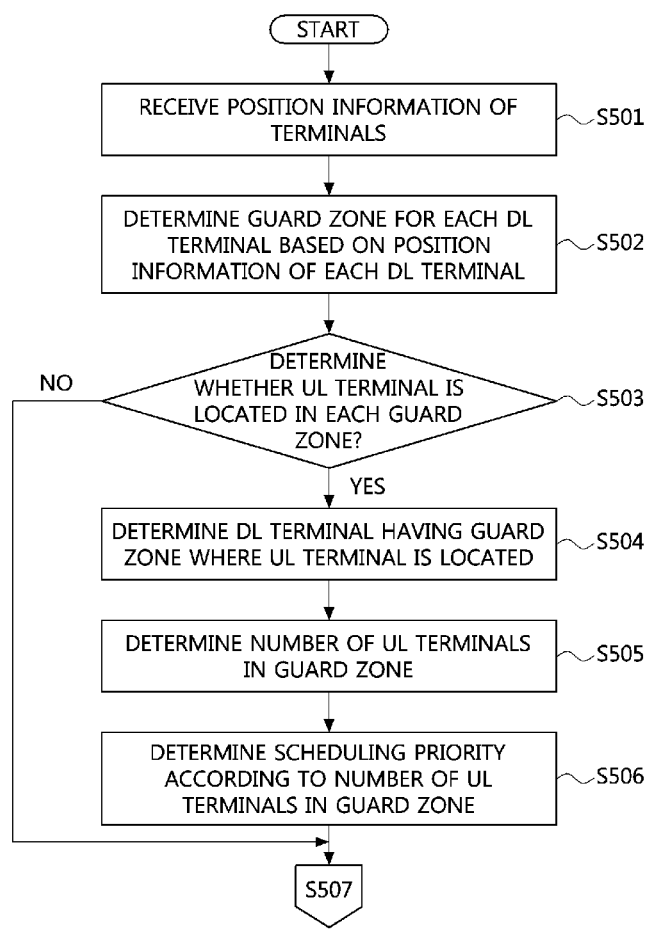
FIGS. 5A and 5B are flowcharts for explaining an operation method of a base station according to an embodiment of the present disclosure.
Figure 5B:
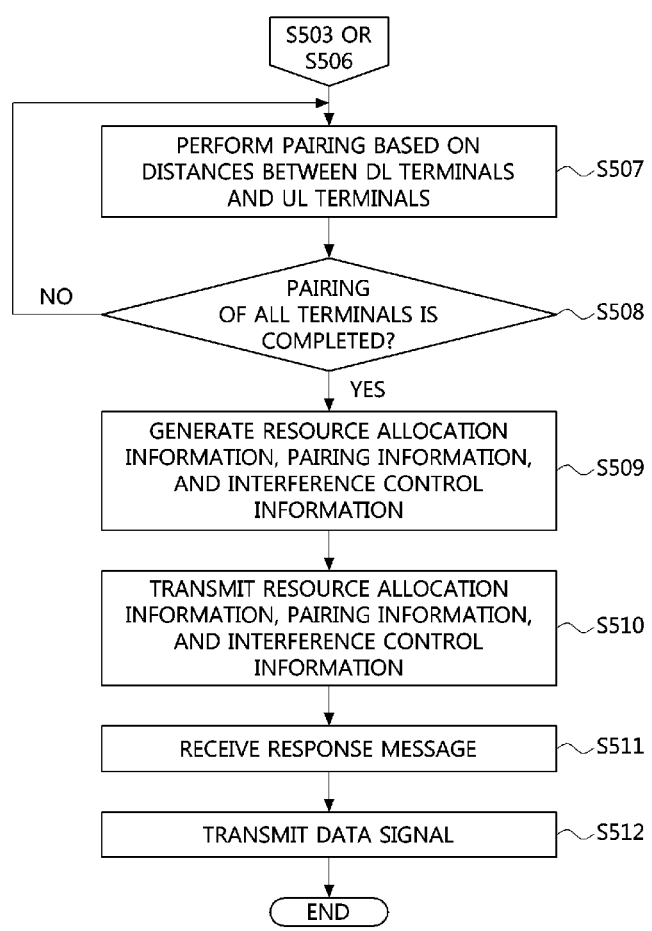

FIGS. 5A and 5B are flowcharts for explaining an operation method of a base station according to an embodiment of the present disclosure.

Referring to FIG. 5A, a base station may perform clustering and scheduling based on a user pairing algorithm. The base station may receive position information of terminals (S501). A plurality of DL terminals and a plurality of UL terminals may exist in a cell where the base station is located. Here, the base station may receive position information from each of the plurality of DL terminals and the plurality of UL terminals.

The base station may determine a guard zone based on the position information of each of the DL terminals (S502). For example, the base station may configure a circle having a radius R around the position of the DL terminal based on the position information of the DL terminal. Here, R may be a predetermined constant. The circle with radius R may be referred to as the guard zone.

The base station may determine whether at least one UL terminal is located in the guard zone (S503). The base station may represent distances between the respective DL terminals and the respective UL terminals in the cell as a matrix D(i,j). The element D(i,j) may indicate a distance between an i-th DL terminal and a j-th UL terminal in the cell. The base station may determine a condition matrix C based on the matrix D(i,j) as shown in Equation 1 below.

$$C(i, j) = \begin{cases} 1, & \text{if } D(i, j) \le R, \\ 0, & \text{otherwise.} \end{cases} \quad \text{[Equation 1]}$$

The base station may repeatedly perform pairing for each of the DL terminals and each of the UL terminals to allocate each time slot by updating the matrix C and the matrix D.

For example, the base station may determine $\omega_t$ based on the condition matrix C as shown in Equation 2 below. Here, $\forall t = 1, \ldots, K$.

$$\omega_t = \sum_{i=1}^{K} \sum_{j=1}^{K} C(i, j). \quad \text{[Equation 2]}$$

The base station may determine that there is no UL terminal belonging to a guard zone of a DL terminal when $\omega_t = 0$. On the other hand, the base station may determine that there exists a UL terminal located in a guard zone of a DL terminal when $\omega_t > 0$.

The base station may determine a DL terminal having a guard zone where a UL terminal exists (S504).

The base station may perform the pairing of a DL terminal and a UL terminal differently according to the case where $\omega_t = 0$ and the case where $\omega_t > 0$. For example, if $\omega_t > 0$, the base station may determine a set of DL terminals having a guard zone where a UL terminal is located.

The base station may determine the number of UL terminals in the guard zone (S505).

The base station may determine $\alpha_t(i)$ as shown in Equation 3 below. Here, i=1, 2, ..., K.

$$\alpha_t(i) = \begin{cases} \infty, & \text{if } \theta_t(i) = 0, \\ \theta_1(i), & \text{if } \theta_t(i) \ne 0, \end{cases} \quad \text{[Equation 3]}$$

Here, the base station may determine $\theta_t(i)$ as shown in Equation 3 below.

$$\theta_t(i) = \sum_{j=1}^{K} C(i, j). \quad \text{[Equation 4]}$$

$\theta_t(i)$ may denote the number of UL terminals existing in the guard zone of the i-th DL terminal.

The base station may determine a scheduling priority based on the number of UL terminals (S506).

The base station may assign a higher scheduling priority to a DL terminal having the smaller number of UL terminals in the guard zone among a set of DL terminals. For example, the highest scheduling priority may be assigned to a DL terminal having the smallest number of UL terminal in its guard zone. That is, the base station may preferentially schedule a DL terminal having the smallest number of UL terminals in the guard zone among the set of DL terminals. The base station may determine a DL terminal for scheduling according to the scheduling priority. Also, the base station may determine a UL terminal to be paired with the DL terminal for which scheduling has been determined.

For example, the base station may select a $d_t$-th DL terminal as the DL terminal for scheduling. The base station may determine $d_t$ through Equation 5 below.

$$d_t = \arg\min[\alpha_t(1), \alpha_t(2), \ldots, \alpha_t(K)]^T. \quad \text{[Equation 5]}$$

The base station may determine $d_t$ as $d_t=i$ or $d_t=j$ if i and j are present. Here, $i \ne j$ and $\alpha_t(i) = \alpha_t(j)$. Also, the choice of $d_t=i$ or $d_t=j$ may not affect the performance of the proposed user pairing algorithm.

The base station may perform pairing based on the distances between the respective UL terminals and the respective DL terminals (S507).

The base station may define two vectors $\beta_t$ and $\delta_t$ to select a UL terminal to be paired with the $d_t$-th DL terminal. Here, $\beta_t = [\beta_t(1), \beta_t(2), \ldots, \beta_t(k)]$ and $\delta_t = [\delta_t(1), \delta_t(2), \ldots, \delta_t(k)]$. $\beta_t$ and $\delta_t$ represent the $d_t$-th row of the matrixes C and D, respectively.

The base station may determine vectors t and at based on Equations 6 and 7 below. Here, $\zeta_t = [\zeta_t(1), \zeta_t(2), \ldots, \zeta_t(k)]$ and $\sigma_t = [\sigma_t(1), \sigma_t(2), \ldots, \sigma_t(k)]$.

$$\zeta_t(i) = \begin{cases} \infty, & \text{if } \beta_t(i) = 0, \\ \beta_t(i), & \text{if } \beta_t(i) \ne 0, \end{cases} 1 \le i \le K, \quad \text{[Equation 6]}$$

$$\sigma_t(i) = \zeta_t(i)\delta_t(i), 1 \le i \le K. \quad \text{[Equation 7]}$$

The base station may pair the $u_t$-th UL terminal and the $d_t$-th DL terminal. The base station may determine the $u_t$-th UL terminal based on Equation 8 below.

$$u_t = \arg\min[\sigma_t(1), \sigma_t(2), \ldots, \sigma_t(K)]^T. \quad \text{[Equation 8]}$$

When i and j are present, and $i \ne j$, $\min[\sigma_t(1), \ldots, \sigma_t(k)] = \sigma_t(i) = \sigma_t(j)$. In case that $D(d_t, i) > D(d_t, j)$, the base station may determine $u_t$ as $u_t = i$. This is because a UL terminal remote from the $d_t$-th DL terminal may be located in a guard zone of another DL terminal.

After determining the pairing of the $d_t$-th DL terminal and the $u_t$-th UL terminal, the base station may update the condition matrix C as shown in Equations 9 and 10 below to perform pairing of other DL terminals and other UL terminals.

$$C(d_t,j)=0, \forall j=1,2,\ldots,K, \quad \text{[Equation 9]}$$

$$C(i,u_t)=0, \forall i=1,2,\ldots,K. \quad \text{[Equation 10]}$$

The base station may repeat the operations based on the Equations 2 to 10 when $\omega_t > 0$. The base station may determine the pairing of the $d_t$-th DL terminal and the $u_t$-th UL terminal based on the condition matrix D when $\omega_t = 0$. The base station may determine the condition matrix D based on the following Equations 11 and 12.

$$D(d_\tau,j)=0, \forall \tau=1,2,\ldots,t-1, \quad \text{[Equation 11]}$$

$$D(i,u_\tau)=0, \forall \tau=1,2,\ldots,t-1, \quad \text{[Equation 12]}$$

The base station may determine $d_t$ and $u_t$ based on Equation 13 below.

$$(d_t, u_t) = \arg \max_{i,j} D(i, j). \quad \text{[Equation 13]}$$

The base station may determine whether paring of all terminals is completed (S508). The base station may repeat the operations of Equation 2 and Equations 9 to 13 until t=k. That is, the base station may repeat the operations of Equation 2 and Equations 9 to 13 until the pairing for all the terminals is completed.

If all the terminals are not paired, the base station may perform the step S507 again. If all the terminals are paired, the base station may proceed to a step S509.

The base station may generate the resource allocation information, the pairing information, and the interference control information (S509). The base station may generate scheduling information including the resource allocation information, the pairing information, and the interference control information. The base station may generate the pairing information and the interference control information based on the user pairing algorithm described above. The above-described operations of Equations 1 to 13 may be referred to as the user pairing algorithm.

The resource allocation information may include information on a frequency-time resource allocated to each of a plurality of DL terminals and a plurality of UL terminals located in a cell of the base station. The pairing information may include information about a paired DL terminal for each of a plurality of UL terminals located in a cell of the base station. The interference control information may include information indicating whether each of the DL terminals performs an interference cancellation operation.

The base station may transmit the resource allocation information, the pairing information, and the interference control information (S510). The base station may transmit the scheduling information to each of the plurality of DL terminals and the plurality of DL terminals that have been scheduled. For example, the base station may transmit the scheduling information including the resource allocation information, the pairing information, and the interference control information to each of the plurality of DL terminals that have been scheduled. Also, the base station may transmit the scheduling information including resource the resource allocation information to each of the plurality of UL terminals that have been scheduled.

The base station may receive a response message (S511). The base station may receive a response message indicating that each of the plurality of UL terminals has received the scheduling information including the resource allocation information from each of the plurality of UL terminals. The base station may also receive a response message from each of the plurality of DL terminals indicating that each of the plurality of DL terminals has received the scheduling information including the resource allocation information, the pairing information, and the interference control information.

The base station may transmit and receive data signals (S512). When a response message is received from each of the plurality of DL terminals, the base station may transmit a data signal to each of the plurality of DL terminals. Also, when a response message is received from each of the plurality of UL terminals, the base station may receive a data signal from each of the plurality of UL terminals.

Figure 6:
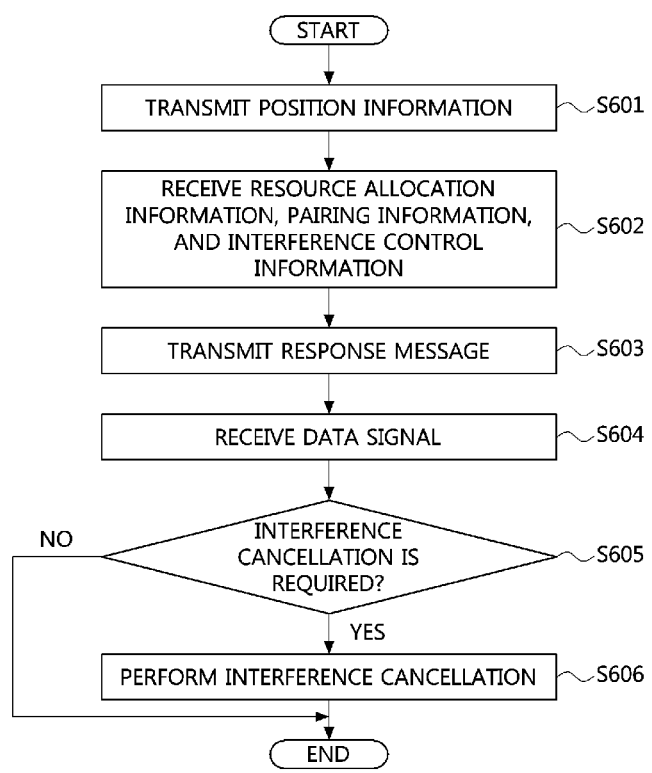
FIG. 6 is a flowchart for explaining an operation method of a downlink terminal according to a second embodiment of the present disclosure.

FIG. 6 is a flowchart for explaining an operation method of a downlink terminal according to a second embodiment of the present disclosure.

Referring to FIG. 6, a DL terminal may transmit its position information (S601). For example, the DL terminal may generate position information of the DL terminal based on a predetermined algorithm. The DL terminal may transmit the position information to a base station of a cell to which the DL terminal belongs.

The DL terminal may receive the resource allocation information, the pairing information, and the interference control information from the base station (S602). That is, the DL terminal may receive the scheduling information including the resource allocation information, the pairing information, and the interference control information from the base station.

The resource allocation information may include information on a subframe or a time slot allocated to the DL terminal. The pairing information may include information on a UL terminal using the same channel with the DL terminal. The interference control information may include information indicating whether the DL terminal is required to perform an interference cancellation operation.

The DL terminal may transmit a response message to the base station (S603). The DL terminal may transmit to the base station a response message indicating that scheduling information including the resource allocation information, the pairing information and the interference control information has been successfully received.

The DL terminal may receive a data signal from the base station (S604). The DL terminal may receive the data signal from the base station through the DL of the base station.

The DL terminal may determine whether to perform the interference cancellation operation (S605). The DL terminal may determine whether to perform the interference cancellation operation based on the interference control information. For example, if the value of the interference control information is '0', the DL terminal may not perform the interference cancellation operation.

The DL terminal may perform the interference cancellation operation (S606). If the value of the interference control information is '1', the DL terminal may perform the interference cancellation operation (S606). The DL terminal may perform the interference cancellation operation upon receiving the data signal from the base station. The interference cancellation operation may be also referred to as the SCCIC operation as described above.

For example, the DL terminal may decode received signals sequentially from a signal having the highest received power among the received signals. The DL terminal may recover the decoded signal again and remove the decoded signal from the received signals. Here, the DL terminal may determine whether it is possible to decode the signal having the largest received power.

For example, the DL terminal may regard all the signals except for the signal having the highest received power as noise. Here, the DL terminal may determine whether it is possible to decode the signal having the highest received power based on a signal-to-interference and noise ratio (SINR) and a predetermined threshold value.

The DL terminal may sort co-channel interference values due to respective transmission signals of the plurality of UL terminals according to their sizes in descending order. For example, the DL terminal may determine whether or not it is possible to decode a transmission signal that generates CCI of the i-th size based on Equation 14 below.

$$\frac{|h_{U,i}|^2 P_{U,i}}{|h_D|^2 P_D + \sum_{i=i+1}^{N} |h_{U,j}|^2 P_{U,j}} \geq \gamma.$$ [Equation 14]

Here, $\gamma$ may indicate the predetermined threshold value. N may indicate the total number of UL terminals that cause interference to the DL terminal due to CCI. The $P_D$ may indicate a transmission power of the base station. $h_D$ may indicate a channel for transmitting a downlink signal to the DL terminal. $P_{U,i}$ may indicate a transmission power of the UL terminal generating the i-th strongest UL CCI with the DL terminal. $h_{U,i}$ may indicate a channel through which a signal generating the i-th strongest UL CCI passes.

The DL terminal may decode all the signals that generate the first to (i−1)th strongest CCI when the interference cancellation for the signal generating the i-th strongest CCI is possible. Therefore, the DL terminal is able to perform interference cancellation on all signals that generate the first to (i−1)th CCI. Also, the DL terminal may previously store or estimate channel information for a transmission signal of a UL terminal that generates CCI which can be cancelled.

Figure 7:
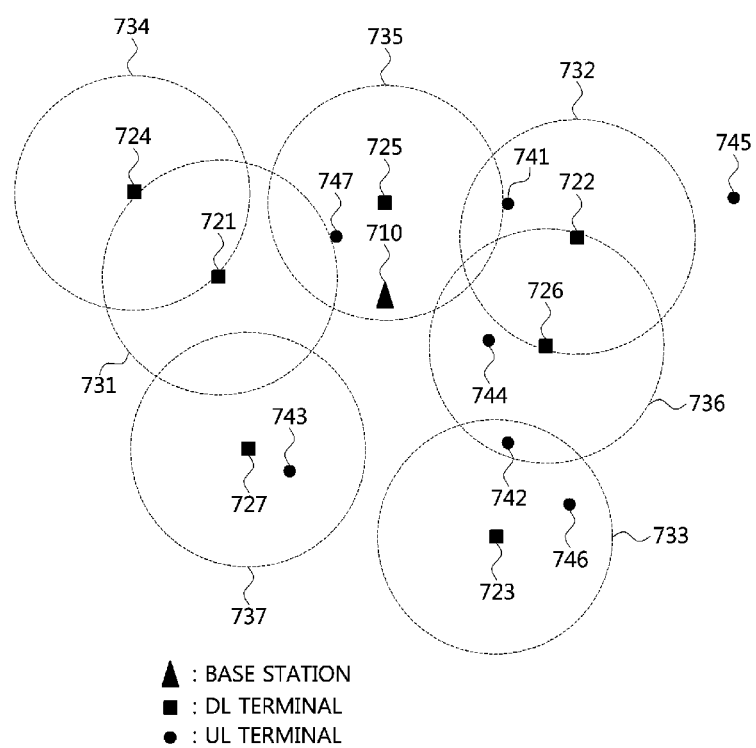
FIG. 7 is a conceptual diagram illustrating exemplary positions of a base station and a plurality of terminals located in a cell.

FIG. 7 is a conceptual diagram illustrating exemplary positions of a base station and a plurality of terminals located in a cell.

Referring to FIG. 7, a base station 710 may simultaneously perform clustering and scheduling based on position information received from a plurality of terminals.

For example, the base station 710 may receive position information of a first DL terminal 721 from the first DL terminal 721. The base station 710 may determine a first guard zone 731 that is a circle centered on the position of the first DL terminal 721 based on the position information of the first DL terminal 721. Also, the base station 710 may receive position information of a second DL terminal 722 from the second DL terminal 722. The base station 710 may determine a second guard zone 732 based on the position of the second DL terminal 722 based on the position information of the second DL terminal 722. Similarly, the base station 710 may receive position information of third to seventh DL terminals 723 to 727 from the third to seventh DL terminals 723 through 727. Similarly, the base station 710 may determine third to seventh guard zones 733 to 737 based on the positions of the third to seventh DL terminals 723 to 727.

The base station 710 may control interference cancellation of the DL terminal according to whether at least one UL terminal is located in a guard zone centered at the DL terminal. For example, when a UL terminal is located in the guard zone centered on the DL terminal, the base station 710 may determine that the size of the CCI exceeds a predetermined threshold interference value. Accordingly, when a UL terminal is located in the guard zone centered on the DL terminal, the base station 710 may transmit a message requesting interference cancellation to the DL terminal. The diameter of the guard zone may be set differently depending on a channel environment or other environment.

For example, the base station 710 may determine whether a UL terminal is located within the guard zone based on the position information of the DL terminal. The base station 710 may determine a scheduling priority for the DL terminal according to whether a UL terminal is located within the guard zone.

For example, the base station 710 may determine a scheduling priority for the DL terminal according to the number of UL terminals located in the guard zone of the DL terminal. For example, the base station 710 may determine a scheduling priority for a DL terminal in a guard zone in which UL terminals smaller than a predetermined threshold number are located to be high. Also, the base station 710 may determine a scheduling priority for a DL terminal having a guard zone in which a UL terminal is not located to be the lowest.

The base station 710 may determine a UL terminal to use a same channel (i.e., to be paired) with a DL terminal having the highest scheduling priority. That is, the base station 710 may pair the DL terminal having the highest scheduling priority and the determined UL terminal. The base station 710 may maximize the number of DL terminals using the same channel with the UL terminal in the guard zone by performing pairing on DL terminals and UL terminals according to the scheduling priorities.

A plurality of UL terminals may be located in the guard zone of the DL terminal having the highest scheduling priority. Here, the base station 710 may determine the UL terminal to use the same channel with the DL terminal, based on distances between the plurality of UL terminals and the DL terminal. For example, the base station 710 may determine a UL terminal located at a shortest distance from the DL terminal among the plurality of UL terminals as the UL terminal for using the same channel with the DL terminal.

There may be a DL terminal having a guard zone where a UL terminal is not located. Here, the base station 710 may determine a scheduling priority for the DL terminal having a guard zone where a UL terminal is not located according to a predetermined algorithm. At this time, the base station 710 may schedule DL terminals and UL terminals based on distances between each of the DL terminals and each of the UL terminals and scheduling priorities of them. For example, the base station 710 may determine scheduling orders for DL terminals according to their scheduling priorities. Also, the base station 710 may determine a UL terminal, which is located the farthest distance from the DL terminal having the guard zone where a UL terminal is not located, to be the UL terminal to use the same channel with the DL terminal.

For example, the base station 710 may generate scheduling information for the first to seventh DL terminals 721 to 727 and the first to seventh UL terminals 741 to 747 based on the position information of the terminals as shown in Tables 1 to 7 below.

Referring to Table 1 below, the base station 710 may allocate a frequency-time resource for each of the first to seventh DL terminals 741 to 747. For example, the base station 710 may allocate a first timeslot (t=1) to the first DL terminal (D1) 721. The base station 710 may allocate a second timeslot (t=2) to the second DL terminal (D2) 722. The base station 710 may allocate a third timeslot (t=3) to the third DL terminal (D3) 723. The base station 710 may allocate a fourth time slot (t=4) to the fourth DL terminal (D4) 724. The base station 710 may allocate a fifth time slot (t=5) to the fifth DL terminal (D5) 725. The base station 710 may allocate a sixth timeslot (t=6) to the sixth DL terminal (D6) 726. The base station 710 may allocate a seventh time slot (t=7) to the seventh DL terminal (D7) 727.

The base station 710 may determine UL terminals located on each of the first to seventh guard zones 731 to 737 based on the position information of the first to seventh UL terminals and the first to seventh DL terminals. For example, when a UL terminal is located in each guard zone, the base station 710 may indicate it with '1' as shown in Table 1. Also, if a UL terminal is not located in each guard zone, the base station 710 may indicate it with '0' as shown in Table 1.

For example, the base station 710 may determine that a UL terminal is not located in the first guard zone 731. The base station 710 may determine that the first UL terminal (U1) 741 is located in the second guard zone 732. That is, the base station 710 may determine that one UL terminal The base station 710 may determine the seventh UL terminal 747 located in the guard zone 735 of the fifth DL terminal 725 as the UL terminal to be paired with the fifth DL terminal 725. The base station 710 may complete resource allocation and pairing for the fifth DL terminal 725 and the seventh UL terminal 747.

TABLE 1

|  |  | U1 | U2 | U3 | U4 | U5 | U6 | U7 | # of UL UEs in GZ | Priority | Scheduled UL UE |
|---|---|---|---|---|---|---|---|---|---|---|---|
| t = 1 | D1 | 0 | 0 | 0 | 0 | 0 | 0 | 0 | 0 | 5 | |
| t = 2 | D2 | 1 | 0 | 0 | 0 | 0 | 0 | 0 | 1 | 6 | |
| t = 3 | D3 | 0 | 1 | 0 | 0 | 0 | 1 | 0 | 2 | 3 | |
| t = 4 | D4 | 0 | 0 | 0 | 0 | 0 | 0 | 0 | 0 | 7 | |
| t = 5 | D5 | 0 | 0 | 0 | 0 | 0 | 0 | 1 | 1 | 1 | U7 |
| t = 6 | D6 | 0 | 1 | 0 | 1 | 0 | 0 | 0 | 2 | 4 | |
| t = 7 | D7 | 0 | 0 | 1 | 0 | 0 | 0 | 0 | 1 | 2 | |

Referring to Table 2 below, when the resource allocation and pairing for the seventh UL terminal 747 and the fifth DL terminal 725 are completed, the base station 710 may perform scheduling for terminals except the seventh UL terminal 747 and the fifth DL terminal 725 paired with the seventh UL terminal 747.

The base station 710 may then assign a first priority to the seventh DL terminal 727 based on the user pairing algorithm. The base station 710 may determine the third UL terminal 743 located in the seventh guard zone 737 as the UL terminal to be paired with the seventh DL terminal 727. The base station 710 may complete resource allocation and pairing for the seventh DL terminal 727 and the third UL terminal 743.

TABLE 2

|  |  | U1 | U2 | U3 | U4 | U5 | U6 | U7 | # of UL UEs in GZ | Priority | Scheduled UL UE |
|---|---|---|---|---|---|---|---|---|---|---|---|
| t = 1 | D1 | 0 | 0 | 0 | 0 | 0 | 0 | — | 0 | 5 | |
| t = 2 | D2 | 1 | 0 | 0 | 0 | 0 | 0 | — | 1 | 2 | |
| t = 3 | D3 | 0 | 1 | 0 | 0 | 0 | 1 | — | 2 | 3 | |
| t = 4 | D4 | 0 | 0 | 0 | 0 | 0 | 0 | — | 0 | 6 | |
| t = 5 | D5 | — | — | — | — | — | — | — | — | — | |
| t = 6 | D6 | 0 | 1 | 0 | 1 | 0 | 0 | — | 2 | 4 | |
| t = 7 | D7 | 0 | 0 | 1 | 0 | 0 | 0 | — | 1 | 1 | U3 |

(U1) 741 is located in the second guard zone 732. The base station 710 may determine that the second UL terminal (U2) 742 and the sixth uplink terminal (U6) 746 are located in the third guard zone 733. That is, the base station 710 may determine that two UL terminals 742 and 746 are located in the third guard zone 733. The base station 710 may determine that a UL terminal is not located in the fourth guard zone 734. The base station 710 may determine that the seventh UL terminal (U7) 747 is located in the fifth guard zone 735. That is, the base station 710 may determine that one UL terminal 747 is located in the fifth guard zone 735. The base station 710 may determine that the second UL terminal (U2) 742 and the fourth UL terminal (U4) 744 are located in the sixth guard zone 736. That is, the base station 710 may determine that two UL terminals 742 and 744 are located in the sixth guard zone 736. The base station 710 may determine that the third UL terminal (U3) 743 is located in the seventh guard zone 737. That is, the base station 710 may determine that one UL terminal (U3) 743 is located in the seventh guard zone 737.

Here, the base station 710 may assign a first priority to the fifth DL terminal 725 based on the user pairing algorithm.

Referring to Table 3 below, when the resource allocation and pairing for the third UL terminal 743 and the seventh DL terminal 727 are completed, the base station 710 may perform scheduling for terminals except for the third UL terminal 743 and the seventh DL terminal 727 paired with the third UL terminal 743.

The base station 710 may then assign a first priority to the second DL terminal 722 based on the user pairing algorithm. The base station 710 may determine the first UL terminal 741 located in the second guard zone 732 as the UL terminal to be paired with the second DL terminal 722. The base station 710 may complete resource allocation and pairing for the second DL terminal 722 and the first UL terminal 741.

TABLE 3

| | | U1 | U2 | U3 | U4 | U5 | U6 | U7 | # of UL UEs in GZ | Priority | Scheduled UL UE |
|---|---|---|---|---|---|---|---|---|---|---|---|
| t = 1 | D1 | 0 | 0 | — | 0 | 0 | 0 | — | 0 | 4 | |
| t = 2 | D2 | 1 | 0 | — | 0 | 0 | 0 | — | 1 | 1 | U1 |
| t = 3 | D3 | 0 | 1 | — | 0 | 0 | 1 | — | 2 | 2 | |
| t = 4 | D4 | 0 | 0 | — | 0 | 0 | 0 | — | 0 | 5 | |
| t = 5 | D5 | — | — | — | — | — | — | — | — | — | |
| t = 6 | D6 | 0 | 1 | — | 1 | 0 | 0 | — | 2 | 3 | |
| t = 7 | D7 | — | — | — | — | — | — | — | — | — | |

Referring to Table 4 below, when the resource allocation and pairing for the first UL terminal 741 and the second DL terminal 722 are completed, the base station 710 may perform scheduling for terminals except for the first UL terminal 741 and the second DL terminal 722 paired with the first UL terminal 741.

The base station 710 may then assign a first priority to the third DL terminal 723 based on the user pairing algorithm. The base station 710 may determine a UL terminal to be paired with the third DL terminal 723 based on the position information of the second UL terminal 742 and the sixth UL terminal 746 located in the third guard zone 733.

For example, the base station 710 may determine a UL terminal located at a closer distance from the third DL terminal 723 among the second UL terminal 742 and the sixth UL terminal 746 as a UL terminal to be paired with the third DL terminal 723. For example, the distance between the third DL terminal 723 and the sixth UL terminal 746 is shorter than the distance between the third DL terminal 723 and the second UL terminal 742.

Thus, the sixth UL terminal 746 may be determined as the UL terminal to be paired with the third DL terminal 723. The base station 710 may complete resource allocation and pairing for the third DL terminal 723 and the sixth UL terminal 746.

TABLE 4

| | | U1 | U2 | U3 | U4 | U5 | U6 | U7 | # of UL UEs in GZ | Priority | Scheduled UL UE |
|---|---|---|---|---|---|---|---|---|---|---|---|
| t = 1 | D1 | — | 0 | — | 0 | 0 | 0 | — | 0 | 3 | |
| t = 2 | D2 | — | — | — | — | — | — | — | — | — | |
| t = 3 | D3 | — | 1 | — | 0 | 0 | 1 | — | 2 | 1 | U6 |
| t = 4 | D4 | — | 0 | — | 0 | 0 | 0 | — | 0 | 4 | |
| t = 5 | D5 | — | — | — | — | — | — | — | — | — | |
| t = 6 | D6 | — | 1 | — | 1 | 0 | 0 | — | 2 | 2 | |
| t = 7 | D7 | — | — | — | — | — | — | — | — | — | |

Referring to Table 5 below, when the resource allocation and pairing for the sixth UL terminal 746 are completed, the base station 710 may perform scheduling for terminals except for the sixth UL terminal 746 and the third DL terminal 723 paired with the sixth UL terminal 746.

The base station 710 may then assign a first priority to the sixth DL terminal 726 based on the user pairing algorithm. The base station 710 may determine a UL terminal to be paired with the sixth DL terminal 726 based on the position information of the second UL terminal 742 and the fourth UL terminal 744 located in the sixth guard zone 736.

For example, the base station 710 may determine a UL terminal located at a closer distance from the sixth DL terminal 726 among the second UL terminal 742 and the fourth UL terminal 744 as a UL terminal to be paired with the sixth DL terminal 726. For example, the distance between the third DL terminal 723 and the fourth UL terminal 744 is shorter than the distance between the third DL terminal 723 and the second UL terminal 742.

Thus, the fourth UL terminal 744 may be determined as the UL terminal to be paired with the sixth DL terminal 726. The base station 710 may complete resource allocation and pairing for the sixth DL terminal 726 and the fourth UL terminal 744.

TABLE 5

| | | U1 | U2 | U3 | U4 | U5 | U6 | U7 | # of UL UEs in GZ | Priority | Scheduled UL UE |
|---|---|---|---|---|---|---|---|---|---|---|---|
| t = 1 | D1 | — | 0 | — | 0 | 0 | — | — | 0 | 2 | |
| t = 2 | D2 | — | — | — | — | — | — | — | | | |
| t = 3 | D3 | — | — | — | — | — | — | — | | | |
| t = 4 | D4 | — | 0 | — | 0 | 0 | — | — | 0 | 3 | |
| t = 5 | D5 | — | — | — | — | — | — | — | | | |
| t = 6 | D6 | — | 1 | — | 1 | 0 | — | — | 2 | 1 | U4 |
| t = 7 | D7 | — | — | — | — | — | — | — | | | |

Referring to Table 6 below, when the resource allocation and pairing for the fourth UL terminal 744 and the sixth DL terminal 726 are completed, the base station 710 may perform scheduling for terminals except for the fourth UL terminal 744 and the sixth DL terminal 726 paired with the fourth UL terminal 744.

The base station 710 may assign a first priority to the first DL terminal 721 based on the user pairing algorithm. The base station 710 may determine a UL terminal to be paired with the first DL terminal 721 based on the position information of the second UL terminal 742 and the fifth UL terminal 745 which are not yet scheduled.

For example, the base station 710 may determine a UL terminal located at a farther distance from the first DL terminal 721 among the second UL terminal 742 and the fifth UL terminal 745 as a UL terminal to be paired with the first DL terminal 721. For example, the distance between the first DL terminal 721 and the fifth UL terminal 745 is farther than the distance between the first DL terminal 721 and the second UL terminal 742.

Thus, the fifth UL terminal 745 may be determined as the UL terminal to be paired with the first DL terminal 721. The base station 710 may complete resource allocation and pairing for the fifth DL terminal 721 and the fifth UL terminal 745.

The base station 710 may assign a second priority to the fourth DL terminal 724 based on the user pairing algorithm. The base station 710 may determine the second UL terminal which is not scheduled as a UL terminal to be paired with the fourth DL terminal 724. The base station 710 may complete resource allocation and pairing for the fourth DL terminal 724 and the second UL terminal 742.

TABLE 6

| | | U1 | U2 | U3 | U4 | U5 | U6 | U7 | # of UL UEs in GZ | Priority | Scheduled UL UE |
|---|---|---|---|---|---|---|---|---|---|---|---|
| t = 1 | D1 | — | 0 | — | — | 0 | — | — | 0 | 1 | U5 |
| t = 2 | D2 | — | — | — | — | — | — | — | | | |
| t = 3 | D3 | — | — | — | — | — | — | — | | | |
| t = 4 | D4 | — | 0 | — | — | 0 | — | — | 0 | 2 | U2 |
| t = 5 | D5 | — | — | — | — | — | — | — | | | |
| t = 6 | D6 | — | — | — | — | — | — | — | | | |
| t = 7 | D7 | — | — | — | — | — | — | — | | | |

As shown in Table 7 below, the base station 710 may complete the resource allocation and pairing for the first to seventh DL terminals 721 to 727 and the first to seventh UL terminals 741 to 747.

TABLE 7

| Time slot | DL terminal | UL terminal |
|---|---|---|
| t = 1 | D1 | U5 |
| t = 2 | D2 | U1 |

TABLE 7-continued

| Time slot | DL terminal | UL terminal |
|---|---|---|
| t = 3 | D3 | U6 |
| t = 4 | D4 | U2 |
| t = 5 | D5 | U7 |
| t = 6 | D6 | U4 |
| t = 7 | D7 | U3 |

Then, the base station 710 may generate scheduling information including resource allocation information, pairing information, and interference control information for the first to seventh DL terminals 721 to 727 and the first to seventh UL terminals 741 to 747.

The resource allocation information may include information on frequency-time resources allocated to the first to seventh DL terminals 721 to 727 and the first to seventh UL terminals 741 to 747, respectively. For example, the resource allocation information may include information on the time slot allocated to each of the DL and UL terminals. The base station 710 may transmit the resource allocation information to the first to seventh DL terminals 721 to 727 and the first to seventh UL terminals 741 to 747, respectively.

The pairing information may include information on UL terminals using the same frequency-time resource for each of the first to seventh DL terminals 721 to 727. For example, the pairing information may include identification information for a UL terminal using the same channel for each of the first to seventh DL terminals 721 to 727. The base station 710 may transmit the pairing information to each of the first to seventh DL terminals 721 to 727.

The interference control information may include a value indicating whether the DL terminal should perform an interference cancellation operation. For example, the interference control information may include a value of '0' or '1'. In this case, the value of '0' may indicate that the interference cancellation operation is not instructed, and the value of '1' may indicate that the interference cancellation operation is instructed.

The base station 710 may determine a DL terminal required to perform the interference cancellation operation based on the user pairing algorithm. For example, the base station 710 may determine that the interference cancellation is required for a DL terminal paired with a UL terminal located in a guard zone. That is, the base station 710 may determine that the interference cancellation operation is required for the DL terminal using the same channel with the UL terminal located at a close distance. For example, the base station 710 may determine that the second DL terminal 722, the third DL terminal 723, and the fifth to seventh DL terminals 725 to 727, which are paired with a UL terminal located in each guard zone, are required to perform the interference cancellation operation.

Accordingly, the base station 710 may transmit the interference control information including the value of '1' instructing to perform the interference cancellation operation to the second DL terminal 722, the third DL terminal 723, and the fifth to seventh DL terminals 725 to 727. The base station 710 may receive, from each of the second DL terminal 722, the third DL terminal 723, and the fifth to seventh DL terminals 725 to 727, a response message indicating that the resource allocation information, pairing information, and interference control information have been received.

After receiving the response message, the base station 710 may transmit a data signal to each of the second DL terminal 722, the third DL terminal 723, and the fifth to seventh DL terminals 725 to 727. Each of the second DL terminal 722, the third DL terminal 723, and the fifth to seventh DL terminals 725 to 727 may receive the data signal from the base station 710. Each of the second DL terminal 722, the third DL terminal 723, and the fifth to seventh DL terminals 725 to 727 may perform the SCCIC operation on the received data signal according to the interference control information for each.

On the other hand, the base station 710 may determine that the interference cancellation operation is not required for the DL terminal paired with the UL terminal that is not located in the guard zone. That is, the base station 710 may determine that the interference cancellation operation is unnecessary for the DL terminal using the same frequency-time resource with the UL terminal located at a far distance. For example, the base station 710 may determine that the first DL terminal 721 and the fourth DL terminal 724 using the same frequency-time resource with the UL terminal located at a far distance are not required to perform the interference cancellation operation.

Accordingly, the base station 710 may transmit interference control information including the value of '0' instructing not to perform the interference cancellation operation to the first DL terminal 721 and the fourth DL terminal 724. The base station 710 may receive a response indicating that each of the terminals has received the scheduling information including the resource allocation information, the pairing information, and the interference control information from each of the first DL terminal 721 and the fourth DL terminal 724.

After receiving the response message, the base station 710 may transmit a data signal to each of the first DL terminal 721 and the fourth DL terminal 724. Each of the first DL terminal 721 and the fourth DL terminal 724 may receive the data signal from the base station 710. At this time, each of the first DL terminal 721 and the fourth DL terminal 724 may receive the data signal without interference cancellation according to the interference control information.

Figure 8:
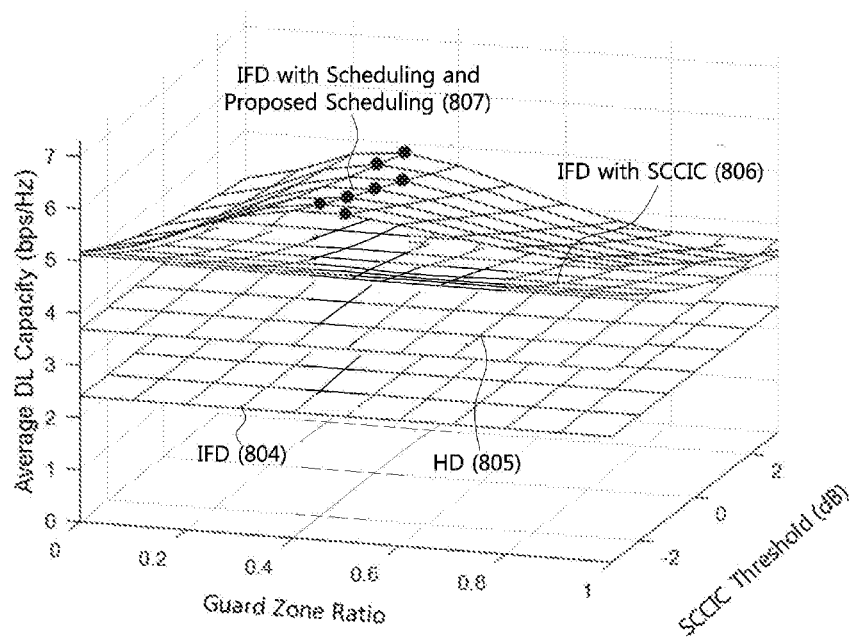
FIG. 8 is a graph for comparing downlink performances of different operating modes including an operating mode based on scheduling and interference control proposed by the present disclosure.

FIG. 8 is a graph for comparing downlink performances of different operating modes including an operating mode based on scheduling and interference control proposed by the present disclosure.

Referring to FIG. 8, average DL capacities (bps/Hz) for four different operating modes 804 to 807 are shown. The average DL capacities may vary according to guard zone ratios and SCCIC thresholds (dB). Also, the average DL capacities 804 to 807 may vary depending on the operating mode of the base station.

The guard zone ratio may mean a ratio to a predetermined radius R of the guard zone. The SCCIC threshold value may mean a reference value for the DL terminal to perform the SCCIC operation. For example, if a received signal strength exceeds the SCCIC threshold, the DL terminal may perform the SCCIC operation on the received signal.

For example, referring to the average DL capacity of the IFD operating mode (i.e., the IFD scheme) 804, the DL performance of a base station operating in the IFD operating mode may be the lowest. Also, referring to the average downlink capacity of the HD operating mode (i.e., the HD scheme) 805, the DL performance of a base station operating in the HD operating mode may be superior to the DL performance of the base station operating in the IFD scheme. On the other hand, referring to the average DL capacity of the operating mode 806 based on IFD scheme with SCCIC, the DL performance of a base station operating in the scheme of IFD with SCCIC may be superior to the DL performance of the base station operating in the HD scheme.

Also, referring to the average DL capacity of the operating mode 807 based on IFD scheme with existing scheduling and proposed scheduling, the DL performance of a base station operating in the operating mode based on IFD scheme with existing scheduling and proposed scheduling may be superior to the DL performance of the base station operating in the operating mode based on IFD scheme with SCCIC. Here, the existing scheduling may mean the IFD scheme with SCCIC.

The UL performances of the above-described four operating modes may be the same. Therefore, the scheduling scheme proposed by the present disclosure can improve the performance of the entire communication network.

Figure 9:
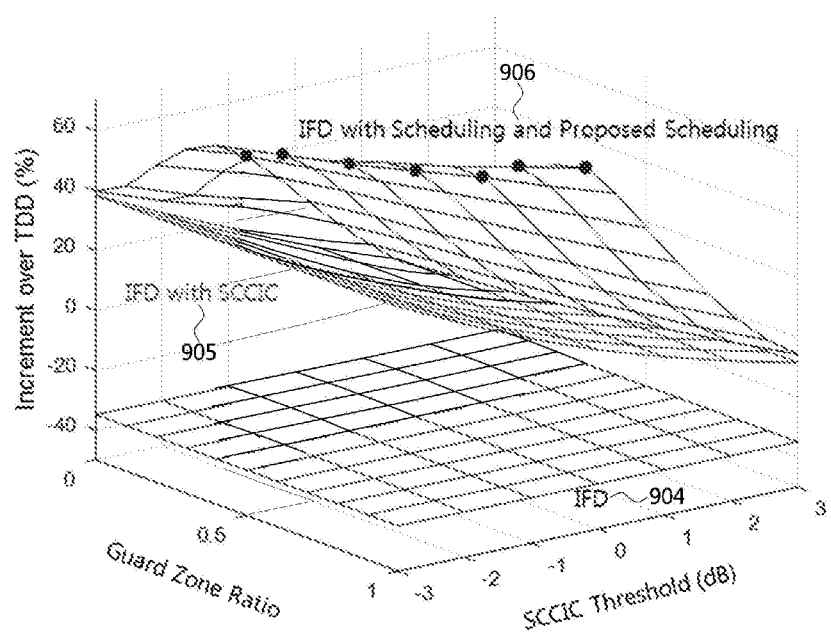
FIG. 9 is a graph for comparing downlink performance increments of different operating modes including an operating mode based on scheduling and interference control proposed by the present disclosure.

FIG. 9 is a graph for comparing downlink performance increments of different operating modes including an operating mode based on scheduling and interference control proposed by the present disclosure.

Referring to FIG. 9, average DL capacity increments over time-division duplexing (TDD) (%) for three different operating modes 904 to 906 are shown. Each of the average DL capacity increments over TDD may be an increment from the average DL capacity in the HD operating mode.

The average DL capacity increments may vary according to guard zone ratios and SCCIC thresholds (dB). Also, the average DL capacity increments may vary depending on the operating mode of the base station.

For example, referring to the average DL capacity increment 904 of the IFD operating mode (i.e., the IFD scheme), DL performance of a base station operating in the IFD scheme may be reduced. On the other hand, referring to the average DL capacity increment 905 of the operating mode based on the IFD scheme with SCCIC, the DL performance of a base station operating in the operating mode based on the IFD scheme with SCCIC may be improved as compared to that of the HD operating mode.

Also, referring to the average DL capacity increment 906 of the operating mode based on the IFD scheme with existing scheduling and proposed scheduling, the DL performance of a base station operating in the operating mode based on the IFD scheme with existing scheduling and proposed scheduling may be further increased as compared to the DL performance of the base station operating in the operating mode based on the IFD scheme with SCCIC. Here, the existing scheduling may mean the IFD scheme with SCCIC.

The UL performances of the above-described four operating modes may be the same. Therefore, the scheduling scheme proposed by the present disclosure can improve the performance of the entire communication network.

Also, the DL performance of the base station in the scheduling scheme proposed by the present disclosure can be improved so as to achieve a DL performance gain up to 60% as compared to the HD operating mode's DL capacity by optimizing the guard zone ratio and the SCCIC threshold.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a base station in an in-band full duplex (IFD) scheme, the operation method comprising:
   receiving position information of each of a plurality of downlink (DL) terminals and a plurality of uplink (UL) terminals;
   determining a guard zone corresponding to each of the plurality of DL terminals based on the position information of each of the plurality of DL terminals;
   determining whether at least one UL terminal is located in the guard zone based on the position information of each of the plurality of UL terminals;
   determining a scheduling priority of each of the plurality of DL terminals according to whether at least one UL terminal is located in the guard zone;
   generating DL control information including frequency-time resource allocation information and interference control information based on the determined scheduling priority; and
   transmitting data signals and the DL control information to the plurality of DL terminals.

2. The operation method according to claim 1, wherein the determining a scheduling priority further comprises:
   when a first UL terminal is located in a first guard zone in which a first DL terminal is centered, generating first frequency-time resource allocation information for allocating a resource to the first DL terminal and the first DL terminal;
   generating first pairing information indicating that the first DL terminal and the first UL terminal use a same frequency-time resource; and
   generating first interference control information instructing interference cancellation.

3. The operation method according to claim 2, wherein the generating DL control information further comprises generating first DL control information including the first frequency-time resource allocation information, the first paring information, and the first interference control information, and the transmitting data signals and the DL control information further comprises transmitting a first data signal and the first DL control information to the first DL terminal.

4. The operation method according to claim 1, wherein the determining a scheduling priority further comprises, when a second UL terminal and a third UL terminal are located in a second guard zone in which a second DL terminal is centered, determining a UL terminal using a same frequency-time resource with the second DL terminal based on position information of the second UL terminal and the third UL terminal.

5. The operation method according to claim 4, wherein the determining a scheduling priority further comprises, when a distance between the second DL terminal and the second UL terminal is smaller than a distance between the second DL terminal and the third UL terminal, determining the second UL terminal as a UL terminal using a same frequency-time resource with the second DL terminal.

6. The operation method according to claim 5, wherein the determining a scheduling priority further comprises:
   generating second frequency-time resource allocation information for allocating a resource to the second DL terminal and the second UL terminal;
   generating second pairing information indicating that the second DL terminal and the second UL terminal use a same frequency-time resource; and
   generating second interference control information instructing interference cancellation.

7. The operation method according to claim 6, wherein the generating DL control information further comprises generating second DL control information including the second frequency-time resource allocation information, the second paring information, and the second interference control information, and the transmitting data signals and the DL control information further comprises transmitting a second data signal and the second DL control information to the second DL terminal.

8. The operation method according to claim 4, wherein the determining a scheduling priority further comprises, when a UL terminal is not located in a third guard zone in which the third DL terminal is centered, determining a UL terminal using a same frequency-time resource with the third DL terminal based on position information of the third UL terminal and position information of a fourth UL terminal which is not located in the third guard zone.

9. The operation method according to claim 8, wherein the determining a scheduling priority further comprises, when a distance between the third DL terminal and the third UL terminal is larger than a distance between the third DL terminal and the fourth UL terminal, determining the third UL terminal as a UL terminal using a same frequency-time resource with the third DL terminal.

10. The operation method according to claim 9, wherein the determining a scheduling priority further comprises:
   generating third frequency-time resource allocation information for allocating a resource to the third DL terminal and the third UL terminal;

generating third pairing information indicating that the third DL terminal and the third UL terminal use a same frequency-time resource; and generating third interference control information instructing interference cancellation, wherein the generating DL control information further comprises generating third DL control information including the third frequency-time resource allocation information, the third paring information, and the third interference control information, and the transmitting data signals and the DL control information further comprises transmitting a third data signal and the third DL control information to the third DL terminal.

* * * * *